United States Patent [19]
Fugitt et al.

[11] 3,780,220
[45] Dec. 18, 1973

[54] REMOTE CONTROL UNDERWATER OBSERVATION VEHICLE

[75] Inventors: Ronald B. Fugitt, Power; Richard W. Uhrich; Jimmy L. Held, both of San Diego, all of Calif.

[73] Assignee: The United States of America as represented by the Secretary of the Navy, Washington, D.C.

[22] Filed: Aug. 14, 1972

[21] Appl. No.: 280,703

[52] U.S. Cl. ............ 178/6.8, 95/11 W, 178/DIG. 1, 178/DIG. 38, 352/242, 352/243
[51] Int. Cl. ...................... G03b 17/08, H04n 7/18
[58] Field of Search ...................... 178/6, 8, DIG. 1, 178/DIG. 20, DIG. 38; 95/11 W; 294/66 A; 352/242, 243

[56] References Cited
UNITED STATES PATENTS

| | | | |
|---|---|---|---|
| 2,963,543 | 12/1960 | Link | 178/6.8 |
| 2,987,893 | 6/1961 | Robinson | 178/6.8 |
| 2,433,971 | 1/1948 | Adams | 178/DIG. 1 |
| 2,616,031 | 10/1952 | Nosker | 178/DIG. 20 |

*Primary Examiner*—Howard W. Britton
*Attorney*—Richard S. Sciascia et al.

[57] ABSTRACT

The submarine vehicle is connected to a surface operating station by means of a control tether. The control tether contains conduits supplying hydraulic fluid under pressure as well as electrical power to the submarine vehicle. The submarine vehicle is controlled in depth by means of a buoyancy chamber comprising two telescoping chambers which are displaced with respect to each other by means of an internal motor means. A support system attached to the buoyancy chamber provides mounting for a camera to view the underwater location surrounding the submarine vehicle. A combination navigation instrument is mounted on the submarine vehicle and cooperates with the camera to provide an indication of heading and inclination of the vehicle as well as a number of turns the vehicle has made since its launch.

11 Claims, 7 Drawing Figures

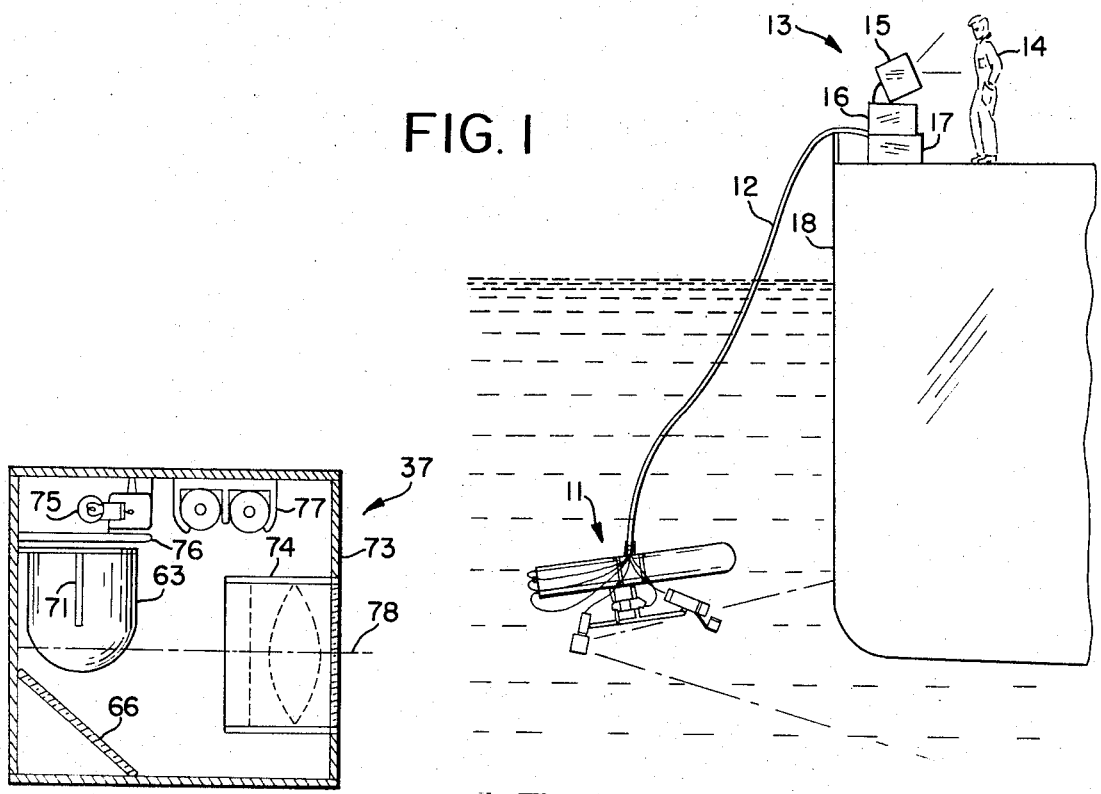
FIG. 1
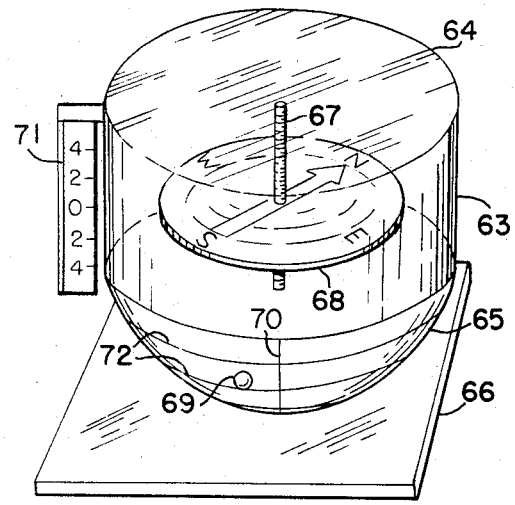
FIG. 6
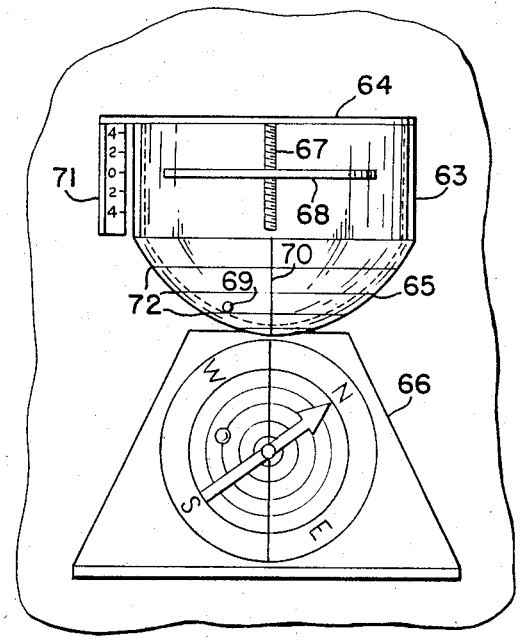
FIG. 5
FIG. 7

REMOTE CONTROL UNDERWATER OBSERVATION VEHICLE

STATEMENT OF GOVERNMENT INTEREST

The invention described herein may be manufactured and used by or for the Government of the United States of America for governmental purposes without the payment of any royalties thereon or therefor.

1. Field of the Invention

This invention pertains to the fields of naval architecture and marine engineering. Moe particularly, the invention pertains to the field of submersible vehicles. In greater particularity, the invention pertains to a tethered submarine vehicle. In still greater particularity, but without limitation thereto, this invention pertains to a submarine vehicle useful for providing visual indication to a surface operator of submerged objects.

2. Description of the Prior Art

As man masters his ocean environments, the ability to examine objects submerged beneath the sea becomes increasingly important. For example, it is frequently desirable for a ship's operational personnel to visually inspect the exterior of the hull of the ship below the water line. This inspection may be useful to determine the condition of the outer surface of the vessel as well as to locate and help analyze mechanical defects in the ship's operational gear. In the past, the only methods available to facilitate such visual inspection has been to either remove the ship from the water, a costly and time-consuming operation, or to employ divers to go beneath the surface of the water and visually explore the surface of the ship. The latter operation has been preferred in recent times due to the increased availability of lightweight, self-contained, underwater breathing apparatus. However, such diving operations require moderate temperatures, relatively calm water, and conditions affording good visibility.

There are many times when these ideal conditions permitting diver inspection to be performed do not occur for several days. This causes undue delays in the operation of the ship and adds greatly to the expense of such operation. Therefore, it would be highly desirable if a low-cost, compact, easily-operated, and effective substitute for the diver could be found.

It has been frequently suggested that small submersible vehicles be used to replace the diver in such circumstances. However, heretofore the availability of such vehicles has been limited. Vehicles of the prior art suitable for such reconnaissance have employed complex remote control telemetry links as well as costly and complex propulsion systems.

SUMMARY OF THE INVENTION

The invention comprises a remotely controlled submarine vehicle which employs a buoyancy chamber which is motor driven to change its physical dimensions and hence the buoyancy of the vehicle. The submarine vehicle is connected to the surface and the remote operator by means of a tether which transmits electrical as well as hydraulic power to the submarine vehicle. Support means directly attach to the buoyancy chamber support hydraulically driven propulsion units and a television camera beneath the buoyancy chamber. A composite navigation instrument indicating bearing, inclination, and number of vehicle turns is mounted so as to be within the view of the television camera.

STATEMENTS OF THE OBJECTS OF THE INVENTION

Accordingly, it is an object of the invention to provide an improved submarine vehicle.

Another object of the invention is to provide an improved submarine vehicle having both remote control and remote power facilities.

A further object of this invention is to provide a remotely controlled and powered submarine vehicle operating from a tether control line.

Another object of the present invention is to provide a submarine vehicle having a buoyancy control system comprising a variable volume chamber.

A still further object of the present invention is to provide a remotely powered submarine vehicle.

A still further object of the present invention is to provide a submarine vehicle employing hydraulic propulsion units which employ operating fluid under pressure supplied from the surface by means of hollow conduits.

Another object of the present invention is to provide a remotely controlled powered submarine vehicle carrying a camera for viewing objects beneath the surface of the water.

A still further object of the present invention is to provide a remotely controlled tethered submarine vehicle having a closed circuit television camera for inspection of submerged objects.

Another object of the present invention is to provide a remotely controlled submarine vehicle having a television camera for viewing both submerged objects and navigational instruments carried by the submarine vehicle.

A still further object of the present invention is to provide a remotely controlled and powered submarine vehicle having a single composite navigational instrument.

A further object of the present invention is to provide a remotely controlled and powered submarine vehicle having instrumentation to provide the remote operator with an indication of the number of changes in bearing made by the submarine vehicle.

Yet another object of the present invention is to provide a remotely controlled submarine vehicle having closed circuit television facilities and a composite instrument indicating the heading of the submarine vehicle, its inclination from the horizontal, and the number of turns made by the vehicle.

These and other objects of the invention will become more readily apparent from the ensuing specification when taken with the drawings.

BRIEF DESCRIPTION OF THE DRAWINGS

FIG. 1 shows the device of the invention being used to inspect the hull of a surface vessel;

FIG. 5 is a perspective view showing the navigation instrument carried by the submarine vehicle according to the invention;

FIG. 6 shows a representative mounting arrangement of the instrument shown in FIG. 5; and FIG. 7 shows the view of the navigational instrument seen by the operator of the vehicle.

DESCRIPTION OF THE PREFERRED EMBODIMENT

Figure 3:
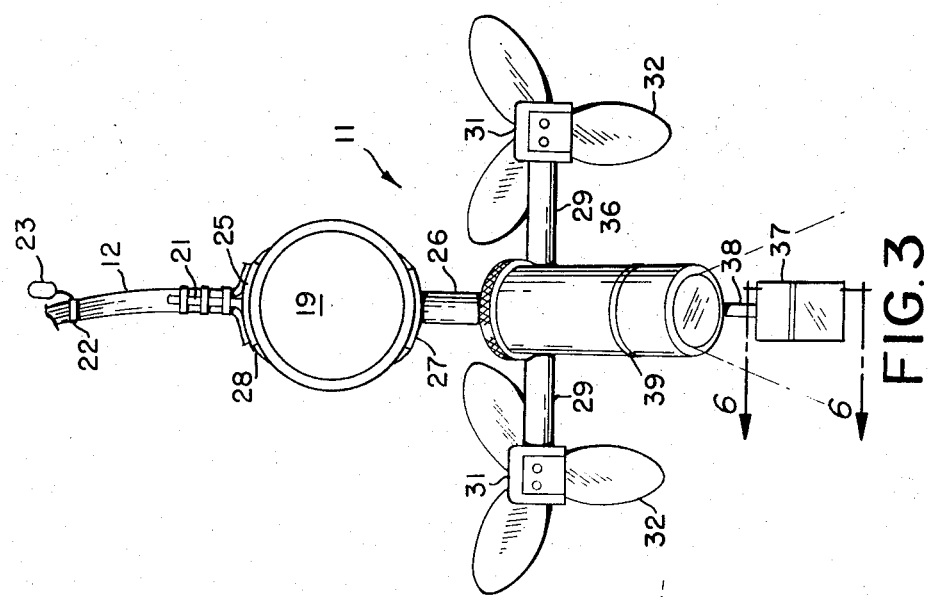
FIG. 3 is a front elevational view of the submarine vehicle according to the invention.

Referring to FIG. 1, submarine vehicle, indicated generally at 11, is shown connected, via a tether line 12, to a suitable surface operating station, indicated generally at 13. As shown operating station 13 is configured to provide optimum operational convenience for an operator 14. That is, a visual readout system 15 permits operator 14 to control submarine vehicle 11 and inspect submerged objects in the vicinity thereof and may be, for example, a closed circuit television receiver. A suitable electrical power supply 16, which, for purposes of explanation, may be considered to comprise electrical batteries, is mounted below visual readout 15. Power supply 16 rests upon a suitable hydraulic power supply 17. Of course, the particular construction of hydraulic power supply 17 will depend, in considerable degree, on the specific hydraulic power requirements of submarine vehicle 11. However, for purposes of completeness, a conventional electric motor-driven pump operating from a hydraulic fluid reservoir may be used. The elctric motor may, of course, be supplied from electrical power supply 16.

As shown, submarine vehicle 11 is used to inspect the hull of ship 18, the operational platform, but other objects could also be inspected, if desired. Likewise, in the illustrated embodiment operator 14 and control station 13 are on the open deck of ship 18, however, they may be positioned in enclosed compartments within the ship 18, if desired.

As previously pointed out, hull inspection is a primary function of the submarine vehicle according to the invention. However, other marine applications may utilize the capabilities of the vehicle as well. For example, submarine vehicle 11 may be used to inspect a target located by sonar in order to ascertain the precise nature of the target. This particular function is of particular utility in mine and submarine countermeasures and frees diver personnel from this hazardous duty. However, as should be obvious, still other applications will suggest themselves and submarine vehicle 11 doubtlessly will be used to replace swimmer-divers in many applications.

Figure 2:
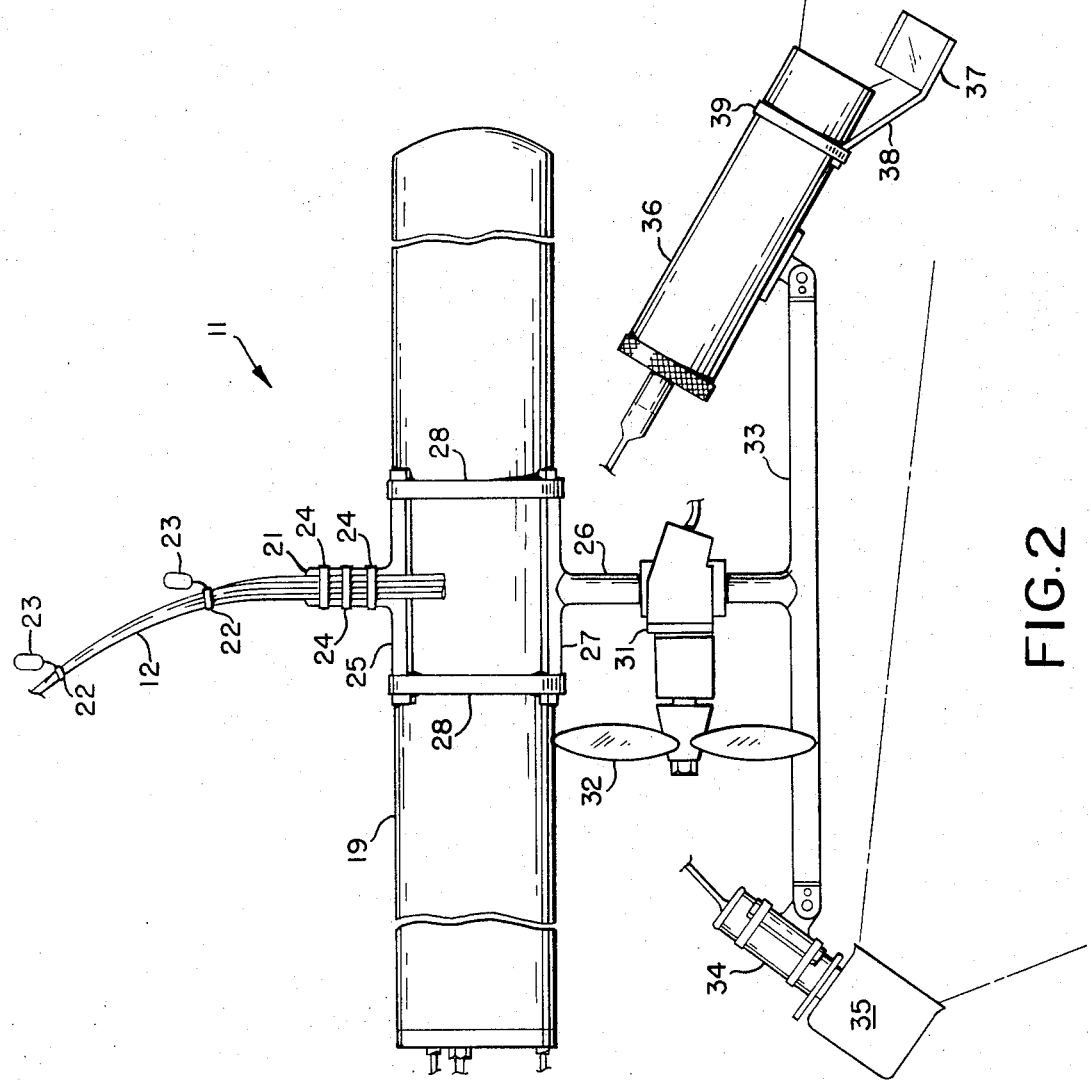
FIG. 2 is a side elevational drawing of the submarine vehicle according to the invention.

Referring to FIGS. 2 and 3, the constructional details of submarine vehicle 11 will be described. As shown, a buoyancy chamber 19 comprises a major portion of submarine vehicle 11. Unlike prior art submarine vehicles, which have buoyancy altering devices within the confines of a rigid hull, submarine vehicle 11 has buoyancy chamber 19 as a major external assembly. This simplicity of construction affords one of the major advantages of the device of the invention, light weight. The constructional details of buoyancy chamber 19 will be described in greater detail presently.

As shown, tether 12 is joined to submarine vehicle 11 by a suitable tether mount 21. As previously noted, tether 12 is composed of electrical conductors as well as hydraulic fluid conduits. This assembly, together with appropriate tensioning line, is bound into a unitary assembly by means of suitable cable clamps 22. In addition to clamps 22, tether line 12 may be encased in a suitable sleeve where deemed desirable. However, satisfactory results have been obtained with the construction illustrated where the various conductors and lines are simply bound into a unitary bundle by the clamps 22.

Flotation units, shown at 23, are also attached to tether cable 12 at points occupied by clamps 22. Flotation units 23 serve to keep tether line 12 neutrally buoyant and provide stabilization thereof as vehicle 11 moves about beneath the surface of the water. Clamps 24, similar to clamps 22, attach tether line 12 to tether support 21. Tether support 21 is constructed with a saddle portion 25 which conforms to buoyancy chamber 19.

A similar saddle portion 27 mounts on the lower side of buoyancy chamber 19 opposite saddle 25 and is bound, along with saddle 25, to buoyancy chamber 19 by means of suitable circular clamps 28. A single-tube, vertically depending support 26 extends downwardly from saddle portion 27 and provides a main support attachment for the other component parts of submarine vehicle 11.

As may be best seen in FIG. 3, tubular motor supports 29 extend outwardly from vertical tube 26 and, at their distal ends support suitable motors 31. As previously noted, motors 31 are of a hydraulic piston type, although turbine types may be used, and are supplied with hydraulic fluid via hydraulic conduits which comprise a portion of tether line 12. A small marine propulsion screw 32 is attached to each motor 31 and converts the rotary motion into a propulsive force.

For purposes of illustration clarity, the connections between tether line 12 and hydraulic motor 31 are omitted. Likewise, other electrical and hydraulic connections between tether line 12 and other components are omitted for similar reasons.

At the lower end of vertical tube 26, a horizontal instrument support tube 33 extends beneath buoyancy chamber 19. At the aft end of instrument support 33, a suitable light source 34 is mounted. Light source 34 provides an illuminating beam which is directed in a forward directing by means of a known light direction optical unit 35. It should be noted, that light source 34 and light director 35 are conventional, low-power, underwater illumination optics and may be of any suitable type.

A conventional underwater television camera 36 is mounted at the forward end of instrument support 23 and is connected to the surface by means of electrical conductors contained within tether line 12. A variety of lightweight television cameras suitable for underwater use are known in the art and choice among them is considered within the purview of those versed in the art. However, for purposes of completeness, it should be noted that the camera manufactured by Hydro Products under the designation TC 125 has proven satisfactory.

Because submarine vehicle 11 is generally operated from other vehicles, such as surface ship 11 or rotary wing aircraft, it is desirable to have navigational instrumentation contained on submarine vehicle 11 to indicate to operator 14 the heading of the vehicle. In the present invention, this is accomplished by means of a navigational instrument 37 which is mounted to be within the field of view of television camera 36. This arrangement avoids separate instrumentation connections to control console 13. In the illustrated embodiment, navigation instrument 37 is supported by an instrument support 38. As shown, support 38 is attached directly to television camera 36 by means of encircling clamp 39. Of course, other mounting arrangements may be employed if desired. For example, support 38 may be joined to support 33 rather than to television camera 36. However, the illustrated arrangement offers the advantage of simplicity of adjustment of television camera 36. That is, once navigation instrument 37 has been positioned within the field of view of camera 36 its relative position thereto need not be changed for alteration of viewing angle of television camera 36.

Figure 4:
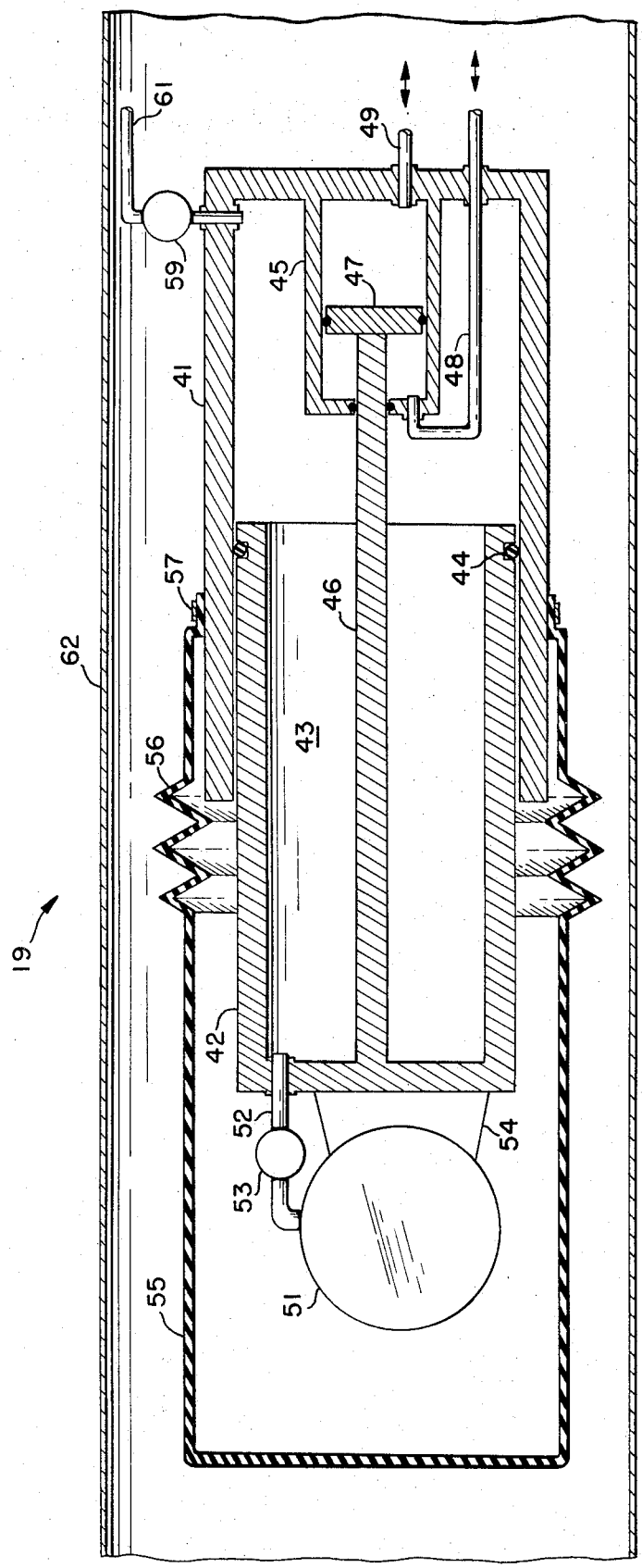
FIG. 4 is a schematic representation, shown in section, of the buoyancy chamber used by the submarine vehicle according to the invention.

Referring now to FIG. 4, the constructional details of buoyancy chamber 19 will be described. As shown, buoyancy chamber 19 comprises two cylindrical members 41 and 42 each closed on one end. The cylinders are dimensioned such that outer cylinder 41 telescopically receives the open end of inner cylinder 42. As may be readily visualized, the two cylinders, thus interfitted, create an enclosed chamber 43 the volume of which is dependent upon the relative position of cylinders 41 and 42.

Enclosed chamber 43 is rendered gas tight by a synthetic rubber seal 44 which is carried by inner cylinder 42 in a position to engage the inner surface of outer cylinder 41. Of course, the particular seal used depends somewhat on the size of the cylinders and pressure involved in the operation of submarine vehicle 11. However, for moderate depths the aforedescribed synthetic rubber O-ring seal has proven satisfactory in developmental models of the invention.

In order to change the buoyancy provided by buoyancy chamber 19 inner cylinder 42 is displaced relative to outer cylinder 41 such as to alter the volume of enclosed chamber 43. This movement is accomplished by means of suitable motor drive connecting the two cylinders. In developmental models of the invention, a linear fluid motor has proven satisfactory. As shown, this linear motor comprises a motor cylinder 45 which, if desired, may be made integral with the closed end of outer cylinder 41. Inner cylinder 42 is connected to this motor means by a suitable connecting rod 46 which, in turn, is attached to a piston 47 which reciprocates in motor cylinder 45.

If desired, a separate hydraulic motor may be employed to actuate the cylinders. In such a system the motor would be connected to the inner surface of the closed end of each cylinder by a push rod arrangement not unlike the illustrated connecting rod 46. In either case, the operation of the invention is the same.

As well understood, the relative reciprocation between cylinders 41 and 42 is effected by the admission of hydraulic fluid under pressure to either side of piston 47 by means of suitable conduits 48 and 49. Conduits 48 and 49 are attached, via tether line 12, to the surface hydraulic power supply 17.

A linear hydraulic motor of the type illustrated has the advantage in the present invention of providing a lock for inner cylinder 42 with respect to outer cylinder 41 in the adjusted position. This locking action may be effected by closing both hydraulic conduits 48 and 49. When it is desired to move piston 47, valving arrangement in the surface control console is positioned such as to admit more fluid to one side of piston 47 while permitting the flow of fluid from the other side of piston 47 from chamber 45. It will be recognized that such hydraulic control systems are well known in the control arts.

A suitable gas supply 51 is connected to enclosed chamber 43 by means of conduit 52 and a pressure actuated valve 53. In this fashion, the gas supply within enclosed chamber 43 may be maintained at a desired pressure such as to minimize leakage at normal operating depths. Gas supply 51 is shown mounted on the closed end of cylinder 42 by means of a suitable mount 54. Of course, if desired, gas source 51 could be mounted upon outer cylinder 41 in a similar fashion.

In order to prevent the corrosive action of the ambient seawater from weakening seal 44, an expandable cover 55 is fitted to outer cylinder 41 so as to enclose the telescoping end of inner cylinder 42. The expansion of cover 55 is made possible by means of a bellows arrangement 56. If desired, other expansion devices may be incorporated in cover 55 to accommodate the excursion of inner cylinder 42 during buoyancy adjustments. As shown, cover 55 is secured to outer cylinder 41 by means of suitable mounting arrangement such as a clamp 57. The enclosed chamber 58 provided by cover 55 may be filled with oil or other suitable material to preserve and prolong the life of seal 44.

Valve 53 is designed to pressurize chamber 43 at the value corresponding to the operational depth of submarine vehicle 11. To prevent a pressure buildup within cylinder 43 from harming seals 44, a provision is made to vent some of the gas contained therein during ascent of submarine vehicle 11. This venting is accomplished by means of a valve 59 and a vent conduit 61. Valve 59 may be, as in the preferred embodiment, pressure actuated such as to vent the gas at a predetermined depth. In developmental models, this depth has been chosen to be 50 feet and operation of the valve at that pressure setting has been quite satisfactory. Of course, other actuation of valve 59 might be accomplished by means of suitable electrical solenoids or other known control devices.

In order to prevent mechanical damage from occurring to cover 55, valve 59, or other external fittings, a suitable protective cover may surround the operational mechanism of buoyancy chamber 19. Such a cover is indicated at 62 and may comprise, for example, a suitable glass-fiber cylinder or lightweight metal cylinder.

As previously noted, it is highly desirable that the submarine vehicle 11 include a navigational instrument such that operator 14 may determine the bearing and position of submarine vehicle 11. Because submarine vehicle 11 operates from a tether, it is also highly desirable to know the number of complete turns submarine vehicle 11 has made with respect to its initial launch position. As may be readily understood, this is to prevent tether line 12, which is a relatively complex line containing both electrical and hydraulic conduits, from becoming too twisted to permit easy reeling of the tether back aboard surface vessel 18.

Referring to FIG. 5, a navigational instrument having the desired properties will now be described. The instrument is housed in a transparent cover including a cylindrical portion 63 and a planar top portion 64 and a hemispherical bottom portion 65. As shown, bottom portion 65 has a rhumb line 70 thereon to indicate the relative bearing of submarine 11. The housing is positioned over an inclined reflector 66. The reflex viewing is also an advantage in the coordination of control action and vehicle movement.

A threaded shaft 67 is attached to cover 64 and extends downwardly in the transparent compartment when top 64 is placed on cylindrical portion 63. A compass card 68 is threadably mounted on threaded shaft 67 and moves up and down on shaft 67 in response to angular positioning by the earth's magnetic field. The indicia carried on compass card 68 is reversed, as seen from below, to provide normal viewing in reflector 66, as will be readily understood by those familiar with mirror optics.

The movement of compass card 68 along shaft 67 is facilitated by filling the transparent compartment comprising the housing, i.e., cylindrical portion 63 and hemispherical portion 65, with a transparent fluid in which compass card 68 is neutrally buoyant. A variety of transparent oils are available for this purpose and compass card 68 may be constructed such that its specific gravity is the same as the fluid used.

In addition to the fluid which provides neutral buoyancy for compass card 68, a fluid droplet 69 of a nonmissible, opaque material, such as mercury, is placed in the bottom of hemispherical portion 65.

The position of compass card 68 along shaft 67 is determined by the number of rotations of compass card 68, that is, the number of complete turns of submarine vehicle 11. This excursion is read by the edge alignment of compass card 68, which may be opaquely colored, with a scale 71 which is conveniently supported from top portion 64. In some cases it may be desirable to place the indicia of scale 71 directly on threaded shaft 67. Likewise, the position of droplet 69 on the hemispherical bottom portion 65 may be indicated by suitable indicia 72 inscribed thereon. Of course, the position of droplet is determined by the inclination of submarine vehicle 11 to the horizontal.

In many cases, the exposed construction shown in FIG. 5 is unsuitable because of the direct contact with the salt water and the arduous environment in which submarine vehicle 11 operates. For this reason, a housing to enclose the various elements comprising the navigational instrument is sometimes desired.

Referring to FIG. 6, the sectional view through such a housing is shown. A suitable watertight pyx or binnacle 73 has a lens 74 mounted in one wall thereof. Lens 74 permits camera 36 to remain focused at a desired working distance and still permit sharp focus for the navigational instrument. Light for viewing the navigational instrument is provided by means of the suitable light source, such as incandescent lamp 75, which is placed above transparent top portion 64. In order to provide a more uniform illumination, a suitable defusing element 76 may be placed between lamp 75 and the navigational instrument, as shown. Power to operate light 75 may be provided from the surface via tether line 12 or, alternatively, by internal power supply within binnacle 73, such as batteries 77.

The precise optical properties of lens 74 will vary somewhat in dependence on the particular camera 36 and the optics employed thereby. However, the optical axis 78 of lens 74 is positioned so as to intercept the median between scale 67 and reflector 66. In this fashion, both scale 71 and the reflected image of the compass card in reflector 66 are within the field of view of lens 74.

Referring to FIG. 7, the view afforded operator 14 of instrument 37 is illustrated. As shown, the heading of submarine vehicle 11 is indicated by the position of the arrow on compass card 68 which cooperates with rhumb line 70, which may be, for example, on top portion 64 instead of bottom portion 65. The position of droplet 69 on hemispherical bottom portion 65 indicates the direction and angle of tilt of submarine vehicle 11. A visual representation of this tilt is made possible by rings 72 which are spaced about hemispherical bottom portion 65. Also, the number of revolutions of submarine vehicle has made since launch and the direction of the revolutions may be observed by scale 71 in cooperation with the edge of compass card 68 as previously described.

Although the foregoing description is sufficient to enable a person skilled in the naval architecture and marine engineering arts to make the invention, the invention will be better understood with reference to the preferred mode of operation.

PREFERRED MODE OF OPERATION

Referring to FIG. 1, operator 14 places submarine vehicle 11 in the water and operates the hydraulic control to adjust the volume of enclosed chamber 43 to regulate the buoyancy of submarine vehicle 11. As submarine vehicle 11 descends to the desired depth, operator 14 pays out tether line 12 to provide power and instrumentation connection between submarine vehicle 11 and the operational console.

As shown in FIG. 1, submarine vehicle 11 is being operated from the deck of a larger surface ship so as to inspect the hull thereof. It should be recognized, however, that other applications for submarine vehicle 11 are possible as well as other operation platforms. That is, submarine vehicle 11 may be operated from very small surface craft of the open boat and outboard propelled type so as to inspect the floor of a body of water or docks as well as larger surface vessels. Likewise, submarine vehicle 11 may be operated from a rotary wing aircraft or a fixed shore installation as well as from surface vessels.

Submarine vehicle 11 is propelled through the water and steered in course by means of hydraulic control to motors 31. The view from television camera 36 which is transmitted to the surface visual readout 15 provides operator 14 with navigational information to permit him to guide submarine vehicle 11 to visually inspect a desired object.

Because of the lightweight and relatively small size of the device of the invention, it may be operated in relatively heavy seas and from small surface craft thus providing visual inspection of underwater objects in conditions which do not permit the actual deployment of diving personnel. In addition, the operation of the device of the invention in the foregoing manner permits command personnel to obtain a heretofore unavailable visual contact with objects beneath the surface of the water requiring their attention.

Upon completion of the assigned observational tasks, submarine vehicle 11 is propelled back to the surface by control of buoyancy chamber 19 and propulsion motors 31. Recovery from the water to the surface of the operating vehicle is made by the conventional hoisting apparatus. Such apparatus is commonly employed by vehicles of the type used as command platforms for submarine vehicle 11. When operating from a small, open boat, submarine vehicle 11 may be manually gripped and lifted from the water by operator 14 since its assembled weight is approximately 50 pounds.

When submarine vehicle 11 is removed from the water, it is washed with fresh water to remove any salt deposits and otherwise made ready for subsequent launchings. During this preparation, compass card 68 is restored to its midposition on threaded shaft 67. This may be accomplished by rotating shaft 67 or moving card 68 by means of an external magnetic influence, such as, for example, a permanent magnet.

The foregoing description taken together with the appended claims constitutes a disclosure such as to enable persons skilled in the marine engineering and naval architecture arts and having the benefits of the teachings contained herein to make and use the invention. Further, the structure herein described meets the objects of invention, and generally constitutes a meritorious advance in the art unobvious to such a skilled worker not having the benefit of the teachings contained herein.

Obviously, many modifications and variations of the present invention are possible in the light of the above teachings, for example, electric motor means may be used in place of the aforedescribed hydraulic motors, and it is therefore understood that within the scope of the disclosed inventive concept, the invention may be practiced otherwise than specifically described.

What is claimed is:

1. A remotely powered and controlled submarine vehicle comprising:
   variable volume means for altering the buoyancy of the submarine vehicle;
   support means attached to the varying buoyancy means and extending downwardly therefrom;
   hydraulic motor means attached to said support means for providing a rotary motion;
   means attached to said hydraulic motor means for propelling the submarine vehicle through a body of water in response to rotary motion furnished by the motor means;
   instrument means effectively attached to said support means for providing navigational information useful in the remote control of the submarine vehicle;
   camera means mounted on the support means for viewing an area about the submarine vehicle and the instrument means; and
   control conduit means attached to the submarine vehicle and connected to the surface for supplying operational fluid under pressure and electrical energy to the variable volume buoyancy means, the motor means, and the camera means.

2. A remotely powered and controlled submarine vehicle according to claim 1 in which the support means comprises an open framework of tubular members.

3. A remotely powered and controlled submarine vehicle comprising:
   means for varying the buoyancy of the submarine vehicle including;
      two cylindrically chambers telescopically fit together for varying the enclosed volume as the two chambers are moved relative to one another,
      operator motor means effectively attached to one cylindrical chamber and fixedly attached to the other cylindrical chamber for moving the two chambers with respect to one another,
      a source of compressed gas mounted on one of the cylindrical chambers to supply gas to said enclosed volume, and
      valve means connected between the source of compressed gas and the enclosed volume for providing a passage for gas from the source of compressed gas for regulating the gas pressure therein,
   support means attached to the varying buoyancy means and extending downwardly therefrom;
   hydraulic motor means attached to said support means for providing rotary motion;
   means attached to said hydraulic motor means for propelling the submarine vehicle through a body of water in response to the rotary motion furnished by the motor means;
   instrument means effectively attached to said support means for providing navigational information useful in the remote control of the submarine vehicle;
   camera means mounted on the support means for viewing an area about the submarine vehicle and the instrument means; and
   control conduit means attached to the submarine vehicle and connected to the surface for supplying fluid pressure and electrical energy to the varying buoyancy means, the motor means, and the camera means.

4. A remotely powered and controlled submarine vehicle according to claim 3 wherein the varying buoyancy means further includes:
   seal means annularly disposed about the outer edge of the smaller of the two cylindrical chambers for providing a gas tight seal between the two chambers; and
   expansible enclosure means attached to the outer surface of the larger diameter cylindrical chamber and extending over the smaller cylindrical chamber to be movable therewith for isolating the sliding surfaces of the two cylindrical chambers and the seal from the ambient sea water.

5. A remotely powered and controlled submarine vehicle according to claim 3 wherein the operator motor attached to the cylindrical chambers includes a double acting fluid motor.

6. A remotely powered and controlled submarine vehicle according to claim 5 wherein the varying buoyancy means further includes pressure actuated valve means mounted on one of the cylindrical chambers and communicating between the enclosed volume and the ambient environment for bleeding off excess gas as the submarine vehicle ascends through the water toward the surface.

7. A remotely powered and controlled submarine vehicle comprising:
   means for varying the buoyancy of the submarine vehicle;
   support means attached to the varying buoyancy means and extending downwardly therefrom;
   hydraulic motor means attached to said support means for providing a rotary motion;
   means attached to said hydraulic motor means for propelling the submarine vehicle through a body of water in response to the rotary motion furnished by the water means;
   combination instrument means effectively attached to said support means for providing an indication of heading, inclination from the horizontal, and the number and direction of complete turns that the vehicle has made subsequent to its launch;
   camera means mounted on the support means for viewing an area about the submarine vehicle and the instrument means; and control conduit means attached to the submarine vehicle and connected to the surface for supplying fluid pressure and electrical energy to the varying buoyancy means, the motor means, and the camera means.

8. A remotely powered and controlled submarine vehicle according to claim 7 wherein the combination instrument includes:
- transparent container means having a cylindrical top portion and a hemispherical bottom portion,
- cover means closing the transparent container means and having a threaded shaft depending axially and downwardly therefrom to extend into the transparent container means,
- a transparent compass card threadably mounted on the threaded shaft,
- a fluid droplet within the transparent container and resting on the hemispherical bottom portion such that its position thereon is dependent upon the angular orientation of the transparent container; and
- graduation markings on the hemispherical bottom portion of a transparent container means cooperating with the droplet to indicate the angular orientation.

9. A remotely powered and controlled submarine vehicle according to claim 8 wherein a combination instrument further includes revolution counter means attached to said cover and cooperatively disposed with respect to said compass card so as to indicate the number of revolutions of the card on the threaded shaft.

10. A remotely powered and controlled submarine vehicle according to claim 9 wherein the combination instrument further includes a mirror means disposed beneath the transparent container means and positioned with respect thereto so as to permit the viewing of the compass card and fluid droplet from a position alongside the transparent container means so as to thereby present a view of the compass card, the revolution counter means and the fluid droplet.

11. A remotely powered and controlled submarine vehicle according to claim 10 wherein said combination instrument further includes a light source positioned above the transparent cover for illumination of the compass card, revolution counter, and fluid droplet; and
- lens means cooperatively positioned with respect to the transparent container means so as to provide the aforesaid camera means with a focussed image of the combination instrument.

* * * * *